United States Patent
Karve et al.

(10) Patent No.: US 7,804,929 B2
(45) Date of Patent: Sep. 28, 2010

(54) METHOD AND SYSTEM FOR CALCULATING ROD AVERAGE CRITERIA

(75) Inventors: Atul Karve, Wilmington, NC (US); James Fawks, Wilmington, NC (US)

(73) Assignee: Global Nuclear Fuel-Americas, LLC, Wilmington, NC (US)

( * ) Notice: Subject to any disclaimer, the term of this patent is extended or adjusted under 35 U.S.C. 154(b) by 1462 days.

(21) Appl. No.: 11/019,622

(22) Filed: Dec. 23, 2004

(65) Prior Publication Data

US 2006/0165210 A1 Jul. 27, 2006

(51) Int. Cl.
G21C 19/00 (2006.01)
(52) U.S. Cl. .................... 376/260; 376/245; 376/277
(58) Field of Classification Search .......... 376/260, 376/245, 277
See application file for complete search history.

(56) References Cited

U.S. PATENT DOCUMENTS

| | | | |
|---|---|---|---|
| 4,333,797 A | 6/1982 | Nishizawa | |
| 5,636,328 A * | 6/1997 | Kautz et al. | 706/45 |
| 6,236,698 B1 | 5/2001 | Hirukawa et al. | |
| 2002/0067790 A1 | 6/2002 | Fukasawa | |

OTHER PUBLICATIONS

Singh et al., "Reconstruction of Pin Power in Fuel Assemblies from Nodal Calculations in Hexagonal Geometry," Am. Nucl. Energy, vol. 22, No. 10, pp. 629-945, 1995.*
Iwamoto et al., "Pin Power Reconstruction Methods of the Few-Group BWR Core Simulator NEREUS," Journal of Nuclear Science and Technology, vol. 36, No. 12, pp. 1142-1152 (Dec. 1999).*
U.S.N.R.C., SECY-00-0156, Jul. 19, 2000.*
Search Report for European application No. 05257693 dated Nov. 6, 2009.

* cited by examiner

Primary Examiner—Rick Palabrica
(74) Attorney, Agent, or Firm—Harness, Dickey & Pierce

(57) ABSTRACT

A method of calculating and using a constraint for fuel rods is provided. The method may utilize pin nodal exposures and pin nodal powers to obtain the constraint, calculate rod average exposures and rod average powers (kW/ft) in each fuel assembly, and develop maps from the calculated rod average exposures and powers (kW/ft) to operate design, optimization, licensing, and/or monitoring applications.

19 Claims, 3 Drawing Sheets

METHOD AND SYSTEM FOR CALCULATING ROD AVERAGE CRITERIA

BACKGROUND OF INVENTION

1. Field of the Invention

This invention relates generally to method and system for calculating rod average criteria in a nuclear reactor.

2. Description of Related Art

Operating nuclear plants have to conform to regulatory board guidelines for evaluating radiological consequences of design basis accidents. These guidelines provide guidance to licensees of operating power reactors on acceptable applications of Alternative Source Terms (AST); the scope, nature, and documentation of associated analyses and evaluations; consideration of impacts on analyzed risk; and content of submittals. The guidelines establish an acceptable AST and identify the significant attributes of other ASTs that may be found acceptable by the U.S. Nuclear Regulatory Commission (NRC). The guidelines also identify acceptable radiological analysis assumptions for use in conjunction with the accepted AST. The NRC mandates these guidelines in 10 CFR Part 50 documentation, particularly, 10 CFR 50.67 which describes the AST methodology characterized by radionuclide composition and magnitude, chemical and physical form of the nuclides, and the timing of release of these radionuclides. As part of the AST methodology, the inventory of fission products in the reactor core and availability of release to the containment may be determined to be acceptable for use with currently approved fuel. These values are evaluated to determine whether they are consistent with the safety margins, including margins to account for analysis uncertainties. The safety margins are products of specific values and limits contained in the technical specifications (which cannot be changed without NRC approval) and other values, such as assumed accident or transient initial conditions or assumed safety system response times. As an example, fractions of fission product inventory for fuel with a peak exposure up to, for example, 62,000 MWD/MTU (Mega Watt-Days per metric ton of Uranium) may be evaluated, if the maximum linear heat generation rate does not exceed 6.3-kW/ft (kilo-Watt per feet) peak rod average power for exposures exceeding 54,000 MWD/MTU. In other words, the AST methodology basis may simplify the acceptance criterion, (i.e., if the peak rod average exposure exceeds 54,000 MWD/MTU, then the rod's average linear heat generation rate cannot exceed 6.3 kW/ft). Further, fission gas release calculations should be performed using approved methodologies, and the U.S. NRC may consider the methodology on a case-by-case basis. However, current AST methodologies do not have a manner in showing compliance of criterion during the design, optimization, licensing, and/or monitoring phases because current methodologies fail to directly calculate the constraint. In other words, to obtain the criterion of the rods, one may need to manipulate data that is external to the design, optimization, licensing, and/or monitoring phases, which may be a time-consuming and laborious process. Further, conservative assumptions may be employed to determine the criteria, however, this procedure may provide inaccurate criteria, which may adversely impact plant operations.

SUMMARY OF THE INVENTION

The present invention may provide a method and system to define a systematic manner of calculating the constraints in each fuel assembly. Further, exemplary embodiments of the present invention may employ a method to design, optimization, licensing, and/or monitoring applications in a general and flexible manner based on the averaging of weighted (axially) nodal quantities. Further, exemplary embodiments of the present invention may not be dependent on any particular set of methodologies.

Exemplary embodiments of the present invention may provide a method of calculating and using a constraint having at least utilized pin nodal exposures and pin nodal powers to obtain the constraint, calculating rod average exposures and rod average powers (kW/ft) in each fuel assembly, developing core maps from the calculated rod average exposures and powers (kW/ft), and outputting the developed maps.

Other exemplary embodiments may provide the calculation of the rod average exposures and powers (kW/ft) by calculating pin nodal exposures in each axial fuel node.

Other exemplary embodiments may provide the calculation of the rod average exposures and powers (kW/ft) by calculating pin nodal powers in each axial fuel node.

Other exemplary embodiments may further provide the weight factor of the pin nodal exposures.

Other exemplary embodiments may provide the weight factor as one of a total nodal weight and a pin nodal weight.

Other exemplary embodiments may provide the core maps as two-dimensional (2D).

In yet other exemplary embodiments, determining the rod average exposure may develop the 2D core maps.

In yet other exemplary embodiments, determining the rod average power (kW/ft) may develop the 2D core maps.

In yet other exemplary embodiments, determining a peak rod average exposure may develop the 2D core maps.

In yet other exemplary embodiments, determining a peak rod average power (kW/ft) may develop the 2D core maps.

In yet other exemplary embodiments, the 2D core maps may be developed by a ratio of a peak rod average power (kW/ft) to a limit for AST considerations.

Other exemplary embodiments may provide the calculation of the rod average exposures and the rod average powers (kW/ft) in a selected fuel assembly.

Other exemplary embodiments may further provide editing the outputted generation maps.

Exemplary embodiments of the present invention may provide a method of calculating and using a constraint for fuel rods in a nuclear reactor having at least utilized pin nodal exposures and pin nodal powers to obtain the constraint, calculating rod average exposures and rod average powers (kW/ft) in each fuel assembly, developing two dimensional (2D) core maps from the calculated rod average exposures and powers (kW/ft), outputting the developed 2D maps, and editing the outputted generation 2D maps.

These and other features and advantages of this invention are described in, or are apparent from, the following detailed description of various exemplary embodiments of the method and systems according to the invention.

BRIEF DESCRIPTION OF THE DRAWINGS

The present invention will become more apparent by describing, in detail, exemplary embodiments thereof with reference to the attached drawings, wherein like procedures are represented by like reference numerals, which are given by way of illustration only and thus do not limit the exemplary embodiments of the present invention.

DETAILED DESCRIPTION OF EXEMPLARY EMBODIMENTS

Figure 1:
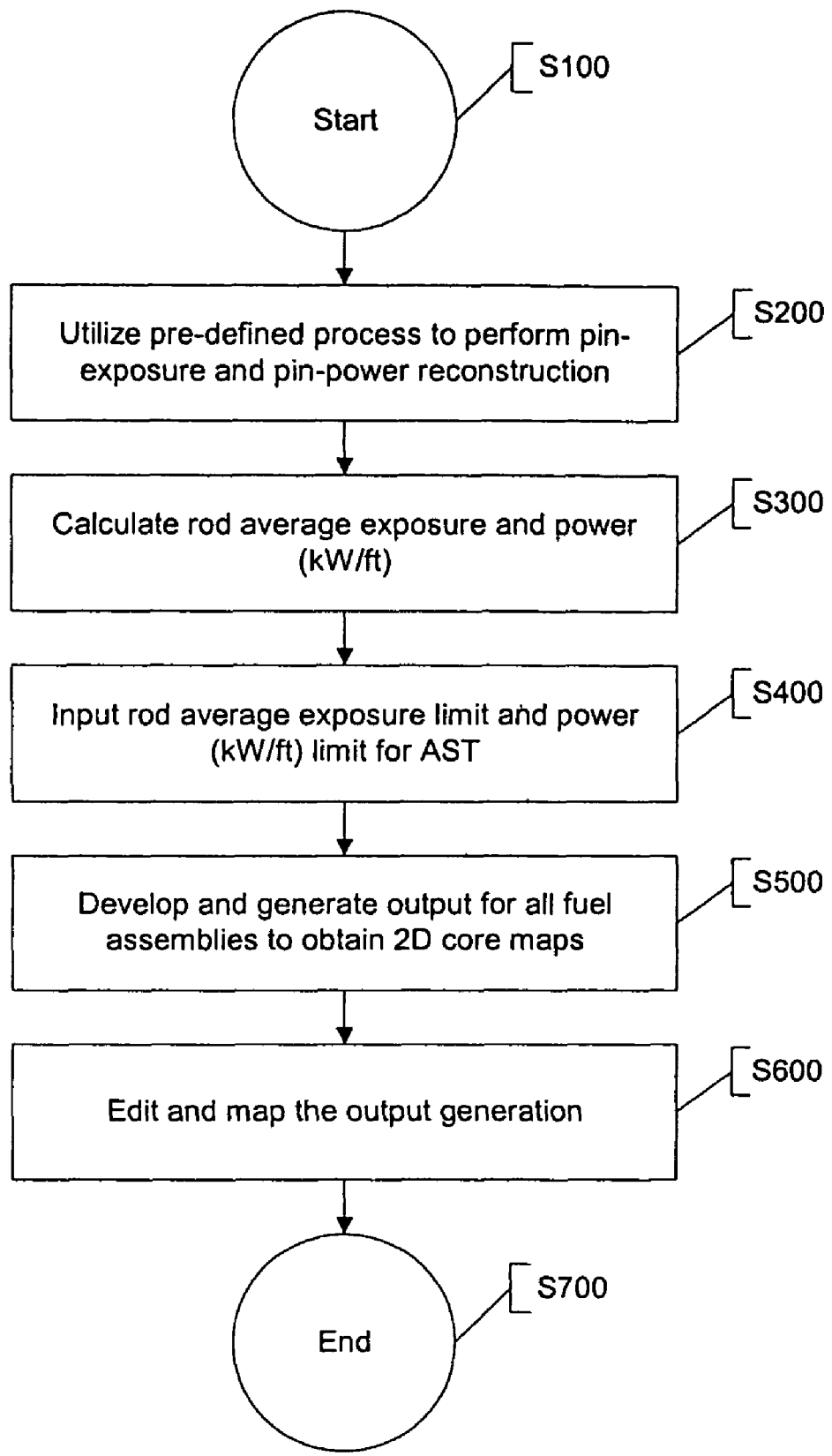
FIG. 1 is a flowchart of a method for calculating rod peak criteria in accordance with an exemplary embodiment of the invention.

The following description is directed toward a presently preferred embodiment of the present invention, which may be operative as an end-user application running. The present invention, however, is not limited to any particular computer system or any particular environment. Instead, those skilled in the art may appreciate that the system and method of the present invention may be advantageously applied to environments requiring management and/or optimization of any multiple control-variable critical industrial/scientific process or system, including chemical and mechanical process simulation systems, pressurized water reactor simulation systems, boiling water reactor simulation systems, and the like. Moreover, the invention may be embodied on a variety of different computer software platforms, including, for example, but not limited to UNIX, LINUX, Macintosh, Windows, Next Step, Open VMS, and the like, used for design, optimization, licensing, and/or monitoring applications. Therefore, the description of the exemplary embodiments, which follows, is for purposes of illustration and not a limitation.

Exemplary embodiments of the present invention may provide a method of calculating and using constraints within the context of an operating nuclear reactor cycle design, licensing, and/or monitoring phase. The U.S. Nuclear Regulatory Commission (NRC) criterion for off-site dose calculations and radiological consequences may be the basis for the constraint. Current methods do not have the means to show compliance of the criterion because the methods do not directly calculate the constraint. It should be appreciated that the methods may include computer codes (i.e., core simulators) used for design, optimization, licensing, and/or core monitoring systems used to monitor a reactor operation. As an exemplary embodiment, the constraint may be on the peak rod average exposure, and its linear heat generation rate (usually indicated by kW/ft). Further, the constraint may also be on peak rod average liner heat generation rate, which may not necessarily be in the rod with peak average exposure. In an exemplary embodiment, a fuel assembly may have as many as 10×10 rods in a boiling water nuclear reactor (BWR). In it, the averaging may be over axial nodes (e.g., zones), as identified by the core simulator model. A typical BWR fuel assembly, for example may have as many as 25 axial nodes. Accordingly, the present invention may define a systematic method of calculating in each fuel assembly, the rod with peak average exposure and liner heat generation rate (kW/ft), and the rod with peak kW/ft and its exposure. In addition, the present invention may employ methods to design, optimization, licensing, and/or monitoring applications. Thus, the present invention may provide the ability to address the constraint in a general and flexible manner based on the averaging of weighted (axially) nodal quantities, and not dependent on any particular set of methodologies.

It should be appreciated throughout the description that "pin nodal" may refer to a part of the rod in an axial node.

It should further be appreciated that the "linear heat generation rate" (kW/ft) may also refer to "power".

FIG. 1 is a flowchart of a method for calculating rod peak criteria in accordance with an exemplary embodiment of the invention. As shown in FIG. 1, the operation begins at S100 and proceeds to S200 in which the operation may utilize pre-defined process to perform pin-exposure and pin-power reconstruction. A pre-defined process may be a pre-existing, well-defined process (e.g., pin-exposure reconstruction and pin-power reconstruction) that is used to determine the criterion, such as the rod average exposure and rod average power (kW/ft) in each fuel assembly. It should be appreciated that the pre-defined process may be specific to the set of methods used. Next, in S300, the operation calculates the rod average exposure and power (kW/ft). Specifically, the calculation may determine: a) peak rod average exposure, b) rod average power (kW/ft) for that rod, c) peak rod average power (kW/ft), and d) rod average exposure for that rod. The rod averages may be performed by an axially averaging for each rod in the assembly. The calculation may be performed utilizing the constraints and implementing into an algorithm described herein. With the calculated rod average exposure and power (kW/ft), the operation may proceed to S400 so as to input the rod average exposure limit and power (kW/ft) limit. The limits may be formed into an AST. The AST methodology basis may formulate the criterion based on limits for both: the peak rod average exposure and its power (kW/ft). For example, if the peak rod average exposure goes over 54,000 MWD/MTU, then this rod's average linear heat generation rate cannot exceed 6.3-kW/ft. Then in S500, the output generation for all the fuel assemblies may be developed to obtain the two-dimensional (2D) core maps. The 2D maps may be used to directly and/or indirectly calculate the constraints. The 2D maps may be generated from: a) the peak rod average exposure, b) the rod average power (kW/ft) for that rod, c) the peak rod average power (kW/ft), and d) the rod average exposure for that rod. It should be appreciated that the operation may also have the option to generate maps of rod average exposure and rod average power (kW/ft) in selected assemblies. In S600, the operation may edit and map the output generation. The maps may be available as output data for further processing. For example, during the design phase one may be interested in further processing of the 2D maps in selected assemblies to determine the magnitude and extent of the problem, (i.e., if it is a "local" problem confined to a few rods or if it is a "global" problem distributed throughout many rods).

Figure 2:
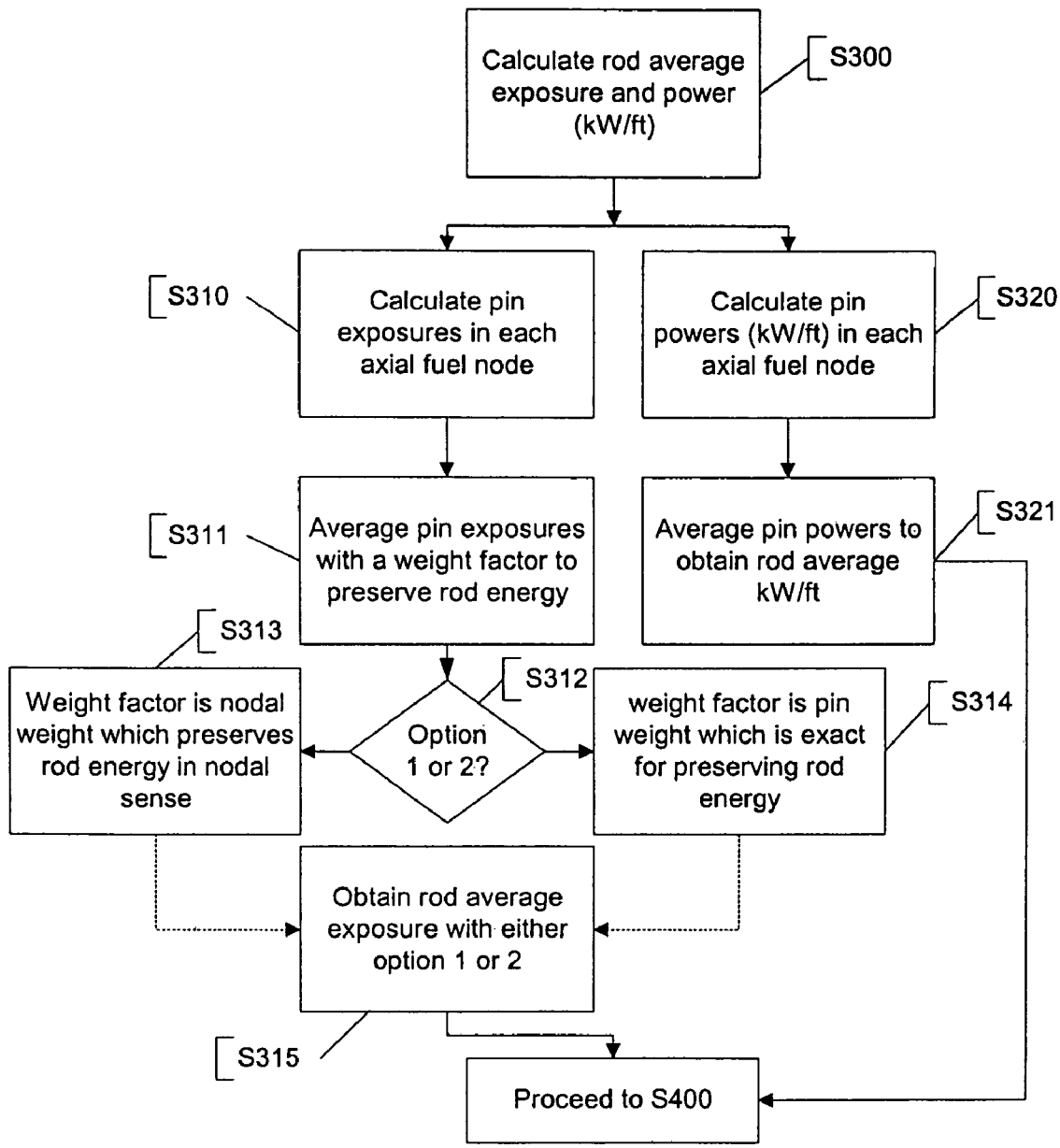
FIG. 2 is a flowchart illustrating in detail of calculating a rod average criteria in accordance with an exemplary embodiment of the invention.

FIG. 2 is a flowchart, illustrating in detail, of calculating the rod average criteria in accordance with an exemplary embodiment of the invention. As shown in FIG. 2, operation S300 may calculate the criteria by calculating at least the pin nodal exposures S310 and pin nodal powers S320 in each axial fuel node. As an exemplary embodiment, the calculated 'pin nodals' may be part of the rod in an axial node, and the fuel may span several axial nodes. At S310, when the operation is calculating the pin nodal exposure, the operation proceeds to S311 to average the pin exposures. The average may be obtained by averaging the pin nodal exposures with a weight factor to preserve the rod's energy. Then, at S312, the operation determines whether the weight factor is based on the nodal weight or the pin weight. If the weight factor is based on the nodal weight, then the operation proceeds to S313 (option 1), which preserves the rod energy in the nodal sense. Nodal sense may mean the weight factor is total weight of interest in the node. For example, when exposure is in terms of MWD/MTU, the weight of interest is the weight of uranium in the unburned fuel. If the weight factor is based on the pin weight, then the operation proceeds to S314 (option 2), which may be exact for preserving rod energy. In this exemplary case, the pin exposure is in terms of the weight of uranium, for example, in the pin only, and not the entire node. Thus, the rod average exposure may be employed between option 1 or 2.

At S320, when the operation is calculating the pin nodal power (kW/ft), the operation proceeds to S321 to average the pin powers. The averaging may be achieved by averaging an axial average for each rod in the assembly. This may give an estimate of the average power (kW/ft) over the entire span of the rod.

Figure 3:
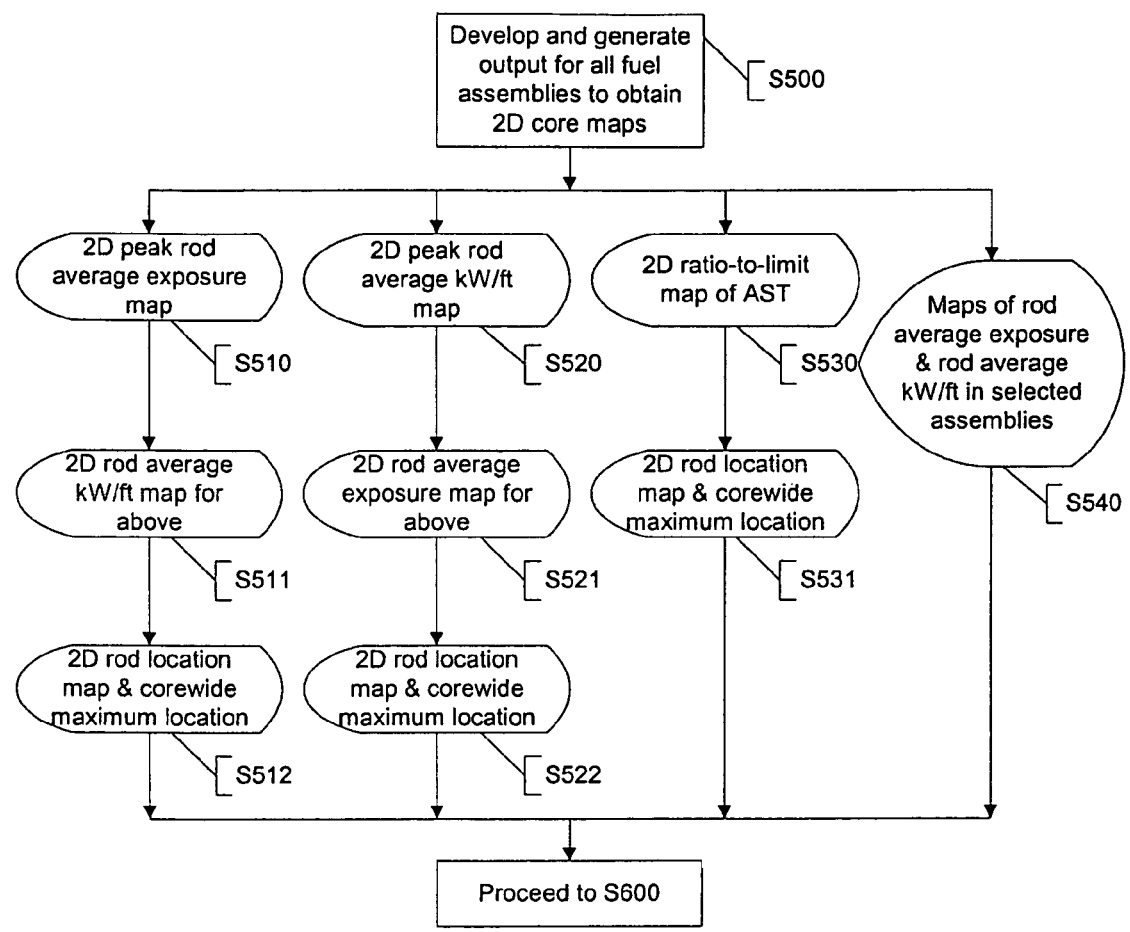
FIG. 3 is a flowchart illustrating in detail of developing and generating the output in accordance with an exemplary embodiment of the invention.

FIG. 3 is a flowchart illustrating in detail of developing and generating the output criteria in accordance with an exemplary embodiment of the invention. As shown in FIG. 3, operation S500 may develop and generate a two-dimensional (2D) map for outputting all fuel assemblies. The generated output may be obtained by determining the peak rod average exposure (S510), the peak rod average power (kW/ft) (S520), the ratio of peak rod average power (kW/ft) to its limit (S530), and rod average exposure and power (kW/ft) in selected assemblies (S540). If the operation determines to develop the peak rod average exposure S510, then the operation proceeds to S511 to develop the rod average power (kW/ft) for the rods in S510. Accordingly, at S512, a 2D core map is generated for the rods in S510.

If the operation determines to develop the peak rod average power (kW/ft) S520, then the operation proceeds to S521 to develop the rod average exposure for the rods in S520. Accordingly, at S522, a 2D core map is generated for the rods in S520.

If the operation determines to develop a ratio of peak road average power (kW/ft) to its limit, then the operation proceeds to S530. At S530, the ratio-to-limit map will be performed. Only locations where the rod average exposure is greater than the exposure limit for AST, will have a number greater than zero (otherwise it will be zero). A map, such as this, may be driven by the AST criterion, which kicks in for the peak rod average power (kW/ft) (for example, 6.3 kW/ft), only when the rod average exposure exceeds a certain value (for example, 54,000 MWD/MTU). Accordingly, at S531, a 2D core map is generated for the rods in S530.

If the operation determines to develop the rod average exposure and rod average power (kW/ft) in only selected assemblies, then the operation proceeds to S540. As an exemplary embodiment, a 10×10 2D map of rod average exposure and rod average power (kW/ft) in a selected 10×10 rod assembly may be outputted. Information to this level of detail may be essential during the design phase, where one may be interested in further process of the 2D maps in selected assemblies to determine the magnitude and extent of the problem (i.e., if it is a "local" problem confined to a few rods or if it is a "global" problem distributed throughout many rods).

As part of the already established well-defined process, the pin nodal exposure and power (kW/ft) may be calculated for each rod within an axial node in an assembly. These datasets are identified as PINEXPO (IROD, JROD, KC) and PINKWFT (IROD, JROD, KC), where IROD and JROD run from 1 to N, the maximum number of rods in a N×N fuel assembly. It should be appreciated that the assembly dependency of PINEXPO and PINKWFT may be omitted. As discussed above, the process of determining PINEXPO and PINKWFT may be specific to the set of methods used. The present invention may deal with utilizing the already available data (e.g., the pin nodal exposure and power (kW/ft)) to get the rod average exposure and the rod average power (kW/ft) in each fuel assembly for all rods, including up to N×N. Performing an axial averaging for each rod in the assembly may give the rod average quantities.

An exemplary embodiment for calculating the rod-average exposure APINEXPO (IROD, JROD) may be obtained as follows:

$$APINEXPO(IROD, JROD) = \frac{\sum_{K=1}^{K=MKC} WTNODE(KC)\delta(KC)}{\sum_{K=1}^{K=MKC} WTNODE(KC)\delta(KC)} PINEXPO(IROD, JROD, KC)$$

In the equation above, MKC is the total number of axial nodes. The rod average exposure APINEXPO (IROD, JROD) may be obtained as an axial (node-wise) weighting of the pin nodal exposures. Accordingly, the nodal mass WTNODE (KC) may be used as a weighting parameter (in units of metric ton of Uranium—MTU), and may approximately conserve the total energy in the rod (in units of MWD—Mega Watt-Days) in an assembly-weighted nodal sense, to obtain the rod average exposure (MWD/MTU). This may be a reasonable approach because during core depletion, as the reactor fuel burns, the fuel exposure tracking is usually on a nodal basis, and not on a pin nodal basis.

The function δ(KC) may be defined as follows:

δ(KC)=1.0 if PINEXPO(IROD,JROD,KC)>0.0

δ(KC)=0.0 if PINEXPO(IROD,JROD,KC)≦0.0

This may ensure that the axial averaging may include only the nodes in which rod actually exists. This may be particularly relevant for part-length rods that do not extend all the way to the top in the active core.

It should be appreciated that the characterization of APINEXPO above may be the "nominal" definition.

In an alternative exemplary embodiment, the pin nodal mass WTPIN (KC) may be used as the weighting parameter, to represent an "alternate" definition of APINEXPO, for example:

$$APINEXPO(IROD, JROD) = \frac{\sum_{K=1}^{K=MKC} WTPIN(KC)}{\sum_{K=1}^{K=MKC} WTPIN(KC)} PINEXPO(IROD, JROD, KC)$$

This approach may be particularly relevant when fuel pin weights may be readily traceable and/or if fuel exposure tracking may be on a pin nodal basis. It should be appreciated that this approach may add further detail to the modeling and to the definition of the rod-average exposure.

An exemplary embodiment for calculating the rod-average power (kW/ft) APINKWFT (IROD, JROD) may be obtained as follows:

$$APINKWFT(IROD, JROD) = \frac{\sum_{K=1}^{K-MKC} DELTAZ(KC)\delta(KCF)}{\sum_{K=1}^{K=MKC} DELTAZ(KC)\delta(KC)} PINKWFT(IROD, JROD, KC)$$

The above equations for APINEXPO and APINKWFT may calculate the rod average exposure and rod average power (kW/ft). Further, determining the maximum value for the N×N rods in each assembly may calculate the peak rod average exposure, the rod average power (kW/ft) for that rod, the peak rod average power (kW/ft) and, the rod average exposure for that rod Once constraint data is available, developing the 2D maps may be a straightforward process so as to make the data available for further use in the design, optimization, licensing, and/or monitoring tools.

Exemplary embodiments of the present invention may define a systematic method of calculating the constraints in each fuel assembly. Further, exemplary embodiments of the present invention may employ methods to operate design, optimization, licensing, and/or monitoring applications in a general and flexible manner based on the averaging of weighted (axially) nodal quantities. Further, exemplary embodiments of the present invention may not be dependent on any particular set of methodologies.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed:

1. A method of calculating rod peak criteria, comprising:
   calculating pin nodal exposures and pin nodal powers of a plurality of rods in a plurality of fuel assemblies using a pre-defined process;
   calculating, for each of the plurality of rods, a rod average exposure using a weight factor associated with the rod, each weight factor based on one of a nodal weight and a pin weight of the rod;
   calculating a plurality of rod average powers of the plurality of rods in all of the fuel assemblies of the plurality of fuel assemblies;
   inputting a rod average exposure limit and a power limit for an alternative source term;
   developing core maps from the plurality of calculated rod average exposures and powers using the inputted rod average exposure limit and the inputted power limit;
   outputting the developed maps; and
   editing the developed maps.

2. The method of claim 1, wherein the core maps are two-dimensional (2D).

3. The method of claim 2, wherein determining the rod average exposures develops the 2D core maps.

4. The method of claim 2, wherein determining the rod average power (kW/ft) develops the 2D core maps.

5. The method of claim 2, wherein determining a peak rod average exposure develops the 2D core maps.

6. The method of claim 2, wherein determining a peak rod average power (kW/ft) develops the 2D core maps.

7. The method of claim 2, wherein a ratio of a peak rod average power (kW/ft) to a limit develops the 2D core maps.

8. The method of claim 1, wherein the calculation of the rod average exposures and the rod average powers are in a selected fuel assembly.

9. A method of calculating rod peak criteria for fuel rods in a nuclear reactor, comprising:
   calculating pin nodal exposures and pin nodal powers;
   calculating rod average exposures and rod average powers in each fuel assembly based on the calculated pin nodal exposures and pin nodal powers and using a weight factor based on one of a nodal weight and a pin weight;
   inputting a rod average exposure limit and a power limit for an alternative source term;
   developing two dimensional (2D) core maps from the calculated rod average exposures and powers based on the inputted rod average exposure limit and the inputted power limit;
   outputting the developed 2D maps; and
   editing the outputted generation 2D maps.

10. The method of claim 9, wherein the calculation of the rod average exposures and powers are performed by calculating pin nodal exposures in each axial fuel node.

11. The method of claim 9, wherein the calculation of the rod average exposures and powers (kW/ft) are performed by calculating pin nodal powers in each axial fuel node.

12. The method of claim 9, wherein determining the rod average exposure develops the 2D core maps.

13. The method of claim 9, wherein determining the rod average power (kW/ft) develops the 2D core maps.

14. The method of claim 9, wherein determining a peak rod average exposure develops the 2D core maps.

15. The method of claim 9, wherein determining a peak rod average power (kW/ft) develops the 2D core maps.

16. The method of claim 9, wherein a ratio of a peak rod average power (kW/ft) to a limit develops the 2D core maps.

17. The method of claim 9, wherein the calculation of the rod average exposures and the rod average powers are in a selected fuel assembly.

18. The method of claim 1, wherein calculating the pin nodal exposures and the pin nodal powers of the plurality of rods in the plurality of fuel assemblies using a pre-defined process includes partitioning the plurality of rods into a number of nodes and calculating a pin nodal exposure and a pin nodal power for each node.

19. The method of claim 18, further comprising:
   calculating weight factor for each node of the number of nodes, wherein calculating, for each of the plurality of rods, a rod average exposure using a weight factor associated with the rod includes multiplying each of the calculated pin nodal exposures with their respective calculated weight factor, summing the products of the calculated pin nodal exposures with their respective weight factors to form a first sum and dividing the first sum by a total weight of the rod.

* * * * *